(12) United States Patent
Saniepey

(10) Patent No.: US 11,225,795 B2
(45) Date of Patent: Jan. 18, 2022

(54) CONSTRUCTION ASSEMBLY MADE WITH FIBER GLASS

(71) Applicant: Naser Saniepey, Costa Mesa, CA (US)

(72) Inventor: Naser Saniepey, Costa Mesa, CA (US)

(*) Notice: Subject to any disclaimer, the term of this patent is extended or adjusted under 35 U.S.C. 154(b) by 0 days.

(21) Appl. No.: 17/145,217

(22) Filed: Jan. 8, 2021

(65) Prior Publication Data
US 2021/0131116 A1 May 6, 2021

Related U.S. Application Data

(62) Division of application No. 16/504,188, filed on Jul. 5, 2019, now abandoned.
(Continued)

(51) Int. Cl.
*E04D 3/18* (2006.01)
*E04F 13/08* (2006.01)
(Continued)

(52) U.S. Cl.
CPC .............. *E04D 3/18* (2013.01); *B44C 5/0423* (2013.01); *E04F 13/0866* (2013.01);
(Continued)

(58) Field of Classification Search
CPC .............. E04F 13/0866; E04F 13/0875; E04F 13/0862; E04F 13/0873; E04B 7/00; E04B 7/225; E04B 7/22; E04B 7/20; E04B 7/205; E04D 1/04; E04D 1/10; E04D 3/06; E04D 3/35–355; E04D 7/00–005; E04D 11/00; E04D 11/02; B44C 5/0423; B32B 17/04; B32B 21/042; B32B 2250/03; B32B 2260/026; B32B 2419/04; B32B 2451/00; B32B 3/04; B32B 3/266; B32B 5/26; B32B 13/14; B32B 21/047; B32B 27/12; B32B 2262/101; B32B 2262/106; B32B 2266/0228; B32B 2266/06; B32B 2307/71; B32B 2307/7145; B32B 2419/06;
(Continued)

(56) References Cited

U.S. PATENT DOCUMENTS 1,440,732 A * 1/1923 Gornick ................... E04F 13/02
52/307
1,796,272 A * 3/1931 Stanbrough ......... E04F 13/0862
52/385
(Continued)

FOREIGN PATENT DOCUMENTS

KR       20150050017 A  *  5/2015  ......... E04D 13/0404
WO   WO-2016079212 A1  *  5/2016  ......... E04D 13/0404

OTHER PUBLICATIONS

Fiberglass Warehouse, Laminating Fiberglass Cloth to Plywood, Jun. 3, 2017, https://fiberglasswarehouse.com/blog/post/laminating-fiberglass-cloth-to-plywood (Year: 2017).*

*Primary Examiner* — Theodore V Adamos
(74) *Attorney, Agent, or Firm* — Payam Moradian

(57) ABSTRACT

Provided is a construction assembly comprising: a. a base; b. a layer of glass fiber placed directly on the base; and c. a decorative layer having a plurality of tiles placed immediately on the glass fiber, wherein the glass fiber is mixed with a hardener and a resin to attach the glass fiber directly to the base and the decorative layer.

13 Claims, 7 Drawing Sheets

Related U.S. Application Data

(60) Provisional application No. 62/694,891, filed on Jul. 6, 2018.

(51) Int. Cl.
   *B44C 5/04* (2006.01)
   *B32B 17/04* (2006.01)
   *B32B 21/04* (2006.01)

(52) U.S. Cl.
   CPC .......... *E04F 13/0875* (2013.01); *B32B 17/04* (2013.01); *B32B 21/042* (2013.01); *B32B 2250/03* (2013.01); *B32B 2260/026* (2013.01); *B32B 2419/04* (2013.01); *B32B 2451/00* (2013.01)

(58) Field of Classification Search
   CPC ......... B32B 9/002; B32B 9/047; B32B 15/14; B32B 21/10; B32B 2262/0269; B32B 2266/08; B32B 5/18; B32B 7/12; B32B 2307/3065; B32B 9/005
   See application file for complete search history.

(56) References Cited

U.S. PATENT DOCUMENTS

| | | | | |
|---|---|---|---|---|
| 2,191,522 | A * | 2/1940 | Eckert | E04D 11/00 52/415 |
| 2,718,829 | A ‡ | 9/1955 | Seymour | C04B 41/70 404/31 |
| 3,232,017 | A * | 2/1966 | Prusinski | E04C 2/205 52/309.9 |
| 3,435,577 | A * | 4/1969 | O'Leary | E04F 13/147 52/309.3 |
| 3,521,418 | A ‡ | 7/1970 | Bartoloni | E04F 13/0862 52/318 |
| 3,660,214 | A * | 5/1972 | Nichols, Jr. | E04C 2/041 428/48 |
| 3,809,595 | A ‡ | 5/1974 | Nichols, Jr. et al. | B28B 11/04 156/267 |
| 3,965,635 | A ‡ | 6/1976 | Renkert | B28B 19/0053 52/434 |
| 4,224,773 | A * | 9/1980 | Schworer | B32B 13/12 52/309.8 |
| 4,567,704 | A * | 2/1986 | Bernett | E04F 13/0862 428/49 |
| 4,719,723 | A * | 1/1988 | Van Wagoner | E04D 11/02 52/15 |
| 4,920,716 | A * | 5/1990 | Coffey | E04F 13/04 52/386 |
| 5,070,669 | A * | 12/1991 | Tsai | E04D 3/366 52/309.12 |
| 6,240,691 | B1 ‡ | 6/2001 | Holzkaemper | E04B 1/942 52/315 |
| 9,957,715 | B1 * | 5/2018 | Carlson | E04C 2/296 |
| 2007/0026195 | A1 ‡ | 2/2007 | Pinault | B05D 5/02 428/141 |
| 2007/0094966 | A1 * | 5/2007 | Snyder | E04D 13/1625 52/309.1 |
| 2011/0262701 | A1 ‡ | 10/2011 | Albertelli | E04F 13/0875 428/147 |
| 2014/0083040 | A1 ‡ | 3/2014 | Taylor, Jr. | E04F 13/077 52/513 |
| 2016/0130826 | A1 ‡ | 5/2016 | Larochelle | E06B 1/34 52/514 |
| 2016/0167765 | A1 ‡ | 6/2016 | Barbieri | B64C 3/54 244/46 |
| 2017/0037639 | A1 * | 2/2017 | Taylor, Jr. | B32B 3/085 |

\* cited by examiner
‡ imported from a related application

CONSTRUCTION ASSEMBLY MADE WITH FIBER GLASS

CROSS-REFERENCE TO RELATED APPLICATIONS

This application claims the benefit of priority to U.S. provisional application Ser. No. 62/694,891, filed on Jul. 6, 2018, the contents of which are hereby incorporated by reference.

BACKGROUND SECTION OF THE INVENTION

There are many places in a structure where tiles are placed, including walls, decks, roofs, flooring, and building facades. A problem with structures having tiles is that the structure may too rigid, resulting in excess noise when a person walks on a tile or resulting in breaking of the tiles. In addition, the underlying wood of the structure may be prone to a termite infestation. In case of a roof, the pre-existing structures are prone to fires, wind, and lack of uniformity and insulation. There is a need in the art for a construction method and structure that addresses these drawbacks.

SUMMARY SECTION OF THE INVENTION

Provided is a construction assembly comprising: a. a base; b. a layer of glass fiber placed directly on the base; and c. a decorative layer having a plurality of tiles placed immediately on the glass fiber, wherein the glass fiber is mixed with a hardener and a resin to attach the glass fiber directly to the base and the decorative layer. The hardener percentage compared to the resin can be between 1%-2% weight/weight at STP. The glass fiber can be in form of a sheet. The glass fibers can be in form of chopped fibers. Optionally, an additional chemical compound acting an adhesive is not used in between the fiber glass and the decorative layer. The resin can be selected from the group consisting of one or more of polyester, vinyl ester, epoxy resin, isophthalic, and mixture thereof. The resin can be a polyester resin, the hardener is Methyl Ethyl Ketone Peroxide (MEKP). The combination of the percentage of the hardener can be 1 to 1.25 relative to the polyester weight/weight at STP. The combination of the percentage of the hardener can be 1 to 1.1 relative to the polyester weight/weight at STP. The base can be made from wood, metal or concrete. The base can be made from wood with a pre-applied layer of caulking to fill any of the gaps of the base. The hardener can be an aliphatic, cycloaliphatic, or an aromatic amine and the resin is epoxy based. Calcium Carbonate is added to the mixture of the hardener and the resin.

Provided is a construction assembly made by a process comprising the steps of: a. combining a hardener with a resin to obtain a mixture; b. placing glass fibers on top of a base; c. applying the mixture to the glass fibers on the wood; and d. placing tiles on the glass fibers that area treated by the mixture.

Provided is a roof construction assembly comprising: a. a top and a bottom board made from wood; b. a plurality of rafters for connecting the boards; c. a plurality of plastic foams placed on between the rafters; and d. a layer of glass fiber under the bottom layer. The construction assembly can be prefabricated. A bracket can extend from top of the assembly. A layer of glass fiber can be on top of the top board, and a plurality of decorative elements on top of the fiberglass. The plastic foams can be in form of a sheet. A level of cement or gypsum can be below the glass fiber on the bottom board. The layer of fiberglass can be all around the assembly.

DETAILED DESCRIPTION OF THE INVENTION

Figure 1:
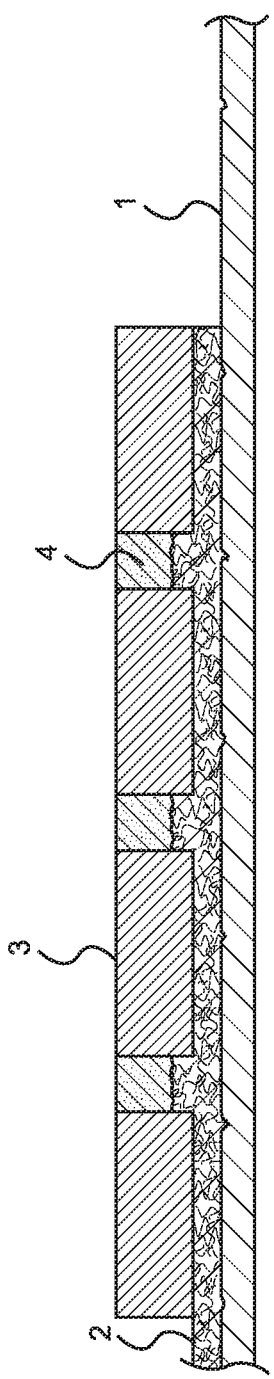
FIG. 1 illustrates a cross-section view of an assembly with a wood base, a fiberglass layer, and a decorative layer of tiles. Also illustrated is plaster used to fill the gaps between the tiles and deformities in the wood base.

Provided is a method for putting tiles 3 and other similar decorative products on walls, decks, roofs, flooring, building facades, kitchen counters, walls, and patio grills. The base 1 of the structure can be a wooden or metal base. The base 1 can be perforated or non-perforated metal, wood, GRP (Glass Reinforced Plastic), or FRP (Fiber-reinforced plastic) structure. A fiberglass 2 layer is placed immediately above the base 1 in physical contact with the base 1, and decorative members such as tiles 3 and stones on top, also in physical contact with the fiber glass 2 layer. These products are easy to install, strong and leak proof. They are also fire, cold, warm, wind and sunlight resistant, and therefore have high durability. This method of construction can be used in many different applications especially in custom designed houses, residential homes, and apartments. Other uses include use in overhead shades for parking and solar panels.

The base 1 can be made from a perforated or non-perforated metal, wood, GRP (Glass Reinforced Plastic), or FRP. Fiber-reinforced plastic (FRP)(also called fiber-reinforced polymer, or fiber-reinforced plastic) is a composite material made of a polymer matrix reinforced with fibers. The base 1 can for example be a drywall or floor for placement of a tile. The base 1 can be the wooden support of a roof.

Glass fibers 2 are put immediately on top of the base 1. Fiberglass 2 layers, with different fabric reinforcements such as cloth, matt, roving, KNYTEX (made with a stitch-bonding process by combining layers of ±45° unidirectional fabric with chopped strand mat), with different weights, and different materials such as E-Glass (alumino-borosilicate glass with less than 1% w/w alkali oxides, mainly used for glass-reinforced plastics), S-Glass (alumino silicate glass without CaO but with high MgO content with high tensile strength), carbon, graphite, carbon fiber, and Aramid (TWARON and KEVLAR) can be used as the fiber reinforcement.

Decorative products, such as tiles, stones, porcelain, ceramic, and facade bricks are placed immediately on the glass fiber 2.

To activate the glass fibers 2, a mixture 8 of a resin 31 and a catalyst hardener 30 is added to the glass 2 fibers. The mixture 31 can further optionally have calcium carbonate 32. After the mixture is applied to the glass fibers 2, the glass fibers 2 form a viscous sticky liquid, which is optimal for placement of tiles. An additional layer of adhesive is not needed.

Examples of resins 31 include polyester, vinyl ester, epoxy resin, and isophthalic.

Examples of hardeners 30 include Methyl Ethyl Ketone Peroxide (MEKP) and amines, such an aliphatic, cycloaliphatic, or an aromatic amine.

Hardener percentage can be between 1%-2% weight/weight compared to the resin at STP (Standard temperature and pressure).

Caulking 4, plaster and other filling agents can be used to fill in between the tiles or fill in the base 1 (if perforated metal, woven wire mesh or if the wood has imperfections).

The fiberglass 2 layer after activation with the resin/hardener, acts as the binder between the base 1 structure and the decorative products such as tiles 3.

Different resins 31 such as polyester, vinyl ester, epoxy resin, or isophthalic and their hardeners 30 can be used in the fiberglass 2 layers to adhere all the components together.

Figure 3A:
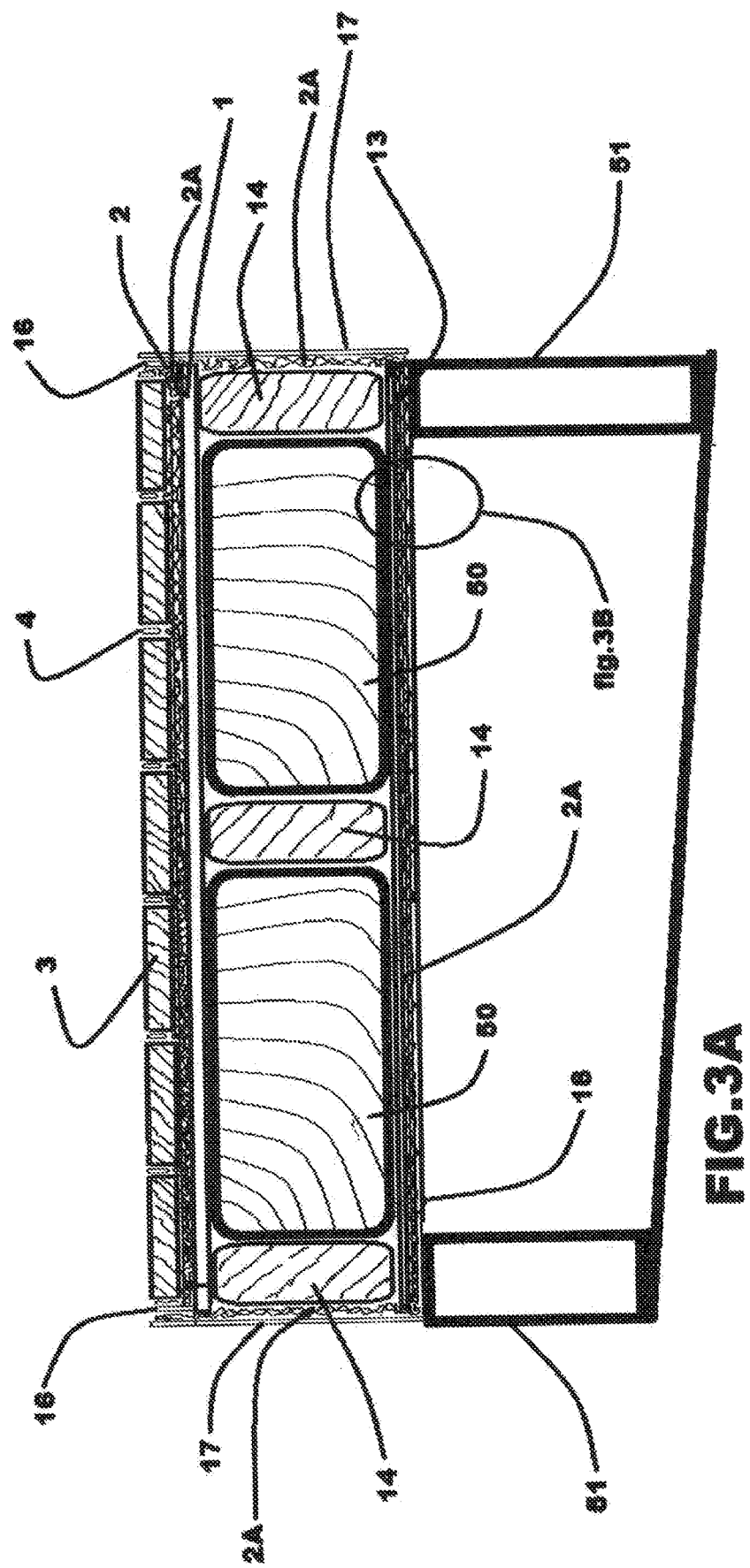
FIG. 3A illustrates a pre-fabricated roof section or panel box.

These construction assemblies can be either pre-made (prefabricated) and get installed later or they can be made onsite depending on the application. For example, in applications for walls, precast sheets of this assembly can be attached to building posts using bolts and nuts. For flooring applications, they can be made onsite. For example, fiberglass 2 can be put on top of dried cement and tiles 3, stones, and can be put on top, or the precast sheets can be installed on top of cement using expansion anchor bolts. For wooden roofs with small slopes, the layers of fiberglass 2 and then tiles 3, stones, bricks, or other materials can be installed on top of it onsite. For high slope roofs, precast roofs (as illustrated in FIG. 3A) can be used instead. If one of the components is already present (for example, wooden roofs or floors), the other two layers can be installed on site. In case of light slopes or flat roofs it can be done on site otherwise in steeped roofs, the precast option is used which is faster and easier to install.

The base 1 layer can be made of wood, metal or concrete. The preferred base 1 for use can be wood. When making the assembly, a completely dry wood is used with all the cracks and small grooves filled, such as with fiberglass 2. Caulking 4 can be used to fill spaces between different boards. Use of resin 31 in fiberglass 2 makes the base 1 more resistant to termites.

Figure 3B:
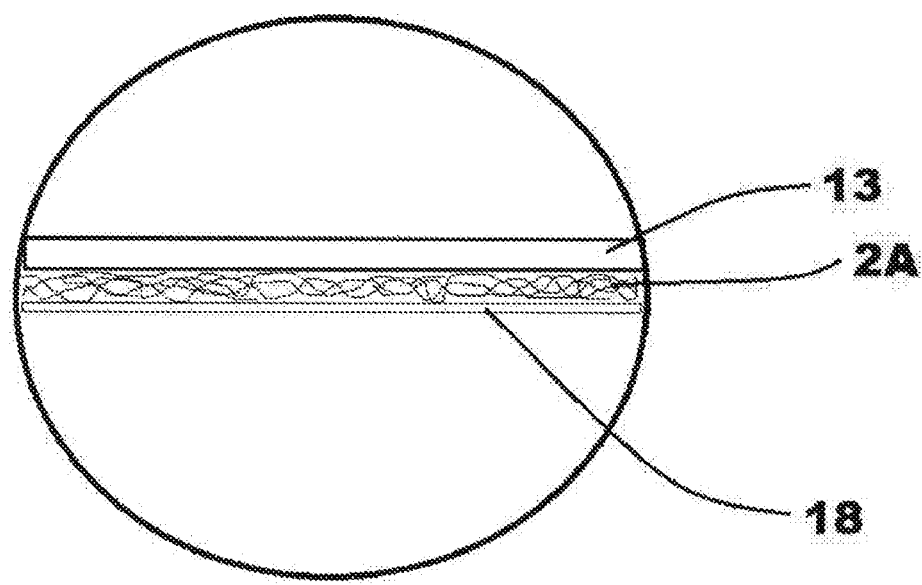
FIG. 3B illustrates a blow-up of FIG. 3A.
Figure 4:
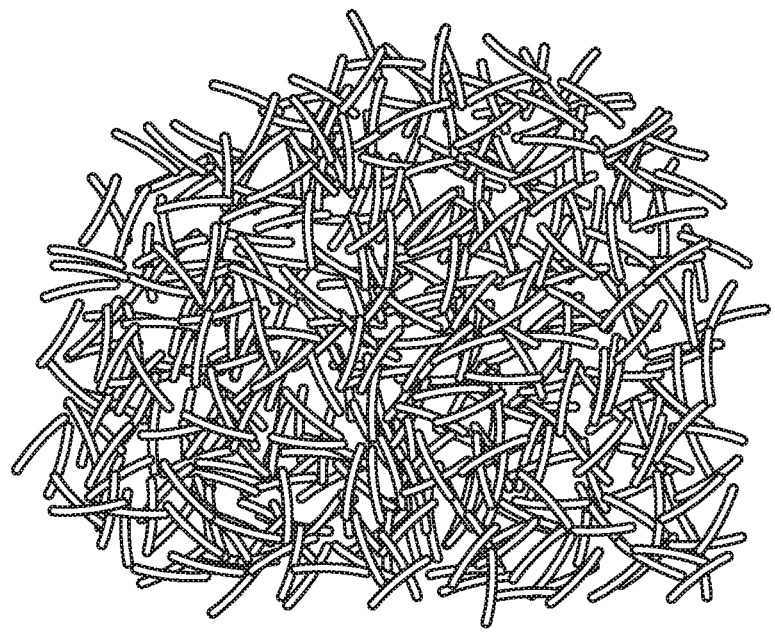
FIG. 4 illustrates chopped glass fibers.

After caulking 4, the surface can be leveled and smoothed by sand paper. Two or three fiberglass 2 layers can be used for ordinary roof/floor/deck/wall. To increase flexibility and cushioning property of the roofs/floors/deck, especially when the base 1 is made of wood, it is preferred to use excess layers of fiberglass 2. In this embodiment, a combination of chopped fiber glass (FIG. 4), hardener, and resin mixed and spread only over the last layer with rollers can be used. In steeped roofs, the start point is the lowest level of the roof. First, a layer of fiber glass 2A is placed. The a galvanized, aluminum or stainless steel angle/bracket 16 with the same thickness of tile/ceramic/porcelain or stone is installed at the edge of wood (base 1) and tightened with nail or screw (or other fastener)(as illustrated in FIG. 3A). Application of fiberglass 2 layers can start from the vertical part of the angle/bracket 16 and can extend to the highest point of the roof, usually the ridge. The seams of fiberglass 2 layers optimally do not coincide on each other and each layer overlaps with the next layer. FIG. 3B is a blow-up of FIG. 3A.

Use of rollers to prevent formation of air bubbles is preferred. After putting the second layer of fiberglass 2 let it dry for 24 hours, then the third layer and tiles will be applied. Caulking 4 will be done after 24 hours of putting tiles. Fiberglass 2 layer made of hardener 1% is more flexible than fiberglass 2 made of denser hardener. Best temperature range is between 65-75 degrees Fahrenheit. Fiberglass gel time is between 15-25 minutes depending on temperature and amount of hardener. Best time for installing the tiles is before gel time. Spacer can be used to build certain space for caulking 4 between tiles. Final caulking 4 is preferably done at least 24 hours after installing tiles. Different colors can be added for a better look of caulking 4.

Perforated sheet metal used for a wall is preferred over non-perforated because bilateral connection is made through the holes. A layer of fiberglass 2 is attached to the surface of tile 3 (stones/ceramics/porcelains). An additional layer of fiber glass can be used for heavier stones/ceramics/tiles. After 24 hours, when it is completely dry, it would then adhere to fresh outer fiberglass 2 layer of the wall/roof. The procedure of using different resins is the same.

The following table illustrates the amount of MEKP used for polyester and vinyl ester resin, preferably polyester resin:

| Polyester Resin Weight to weight | 1% MEKP | 1.25% MEKP | 1.5% MEKP | 1.75% |
|---|---|---|---|---|
| 4 ounces | 1/32 Ounces | 1.50 ounces | 1.75 ounces | 1/16+ |

Other resin and hardener combinations can also be used. For example, if an epoxy resin is used, the hardener can be an aliphatic, cycloaliphatic, or an aromatic amine for epoxy.

Figure 5:
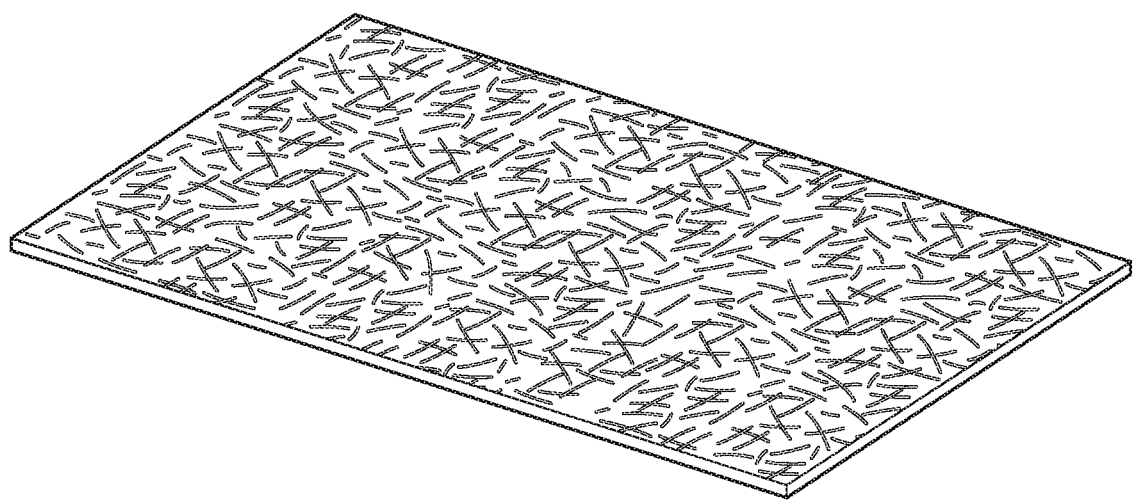
FIG. 5 illustrates a glass fiber sheet.

FIG. 1 illustrates a cross-section view of an assembly with a wood base 1, a fiberglass 2 layer, and a decorative layer of tiles. As illustrated in this drawing, a fiberglass layer 2 can be placed on base 1. The fiber glass 1 can be in form of fibers of FIG. 4 or sheets of FIG. 5. The fiber glass 2 is placed directly on the base 1. Tiles 3 are based on top of the fiber glass 2. The tiles 3 and the base 1 both adhere to fiber glass 2 without the need for an additional adhesive layer. Caulking 4 can be used in between the tiles 3.

Figure 2:
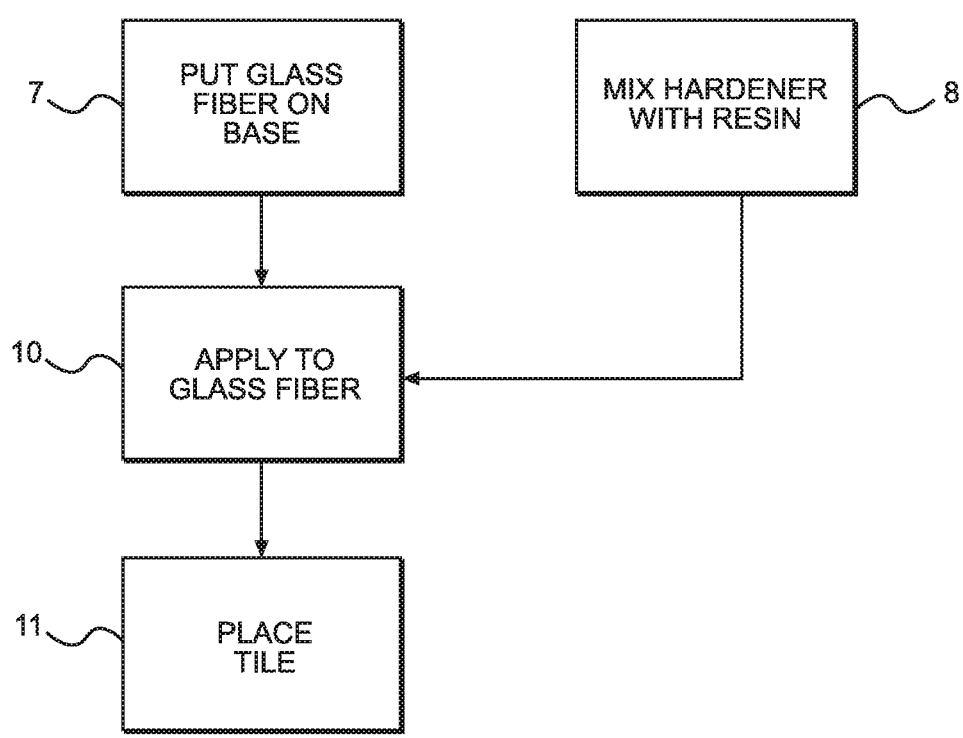
FIG. 2 illustrates the steps of the process in making the assembly.

FIG. 2 illustrates the steps of the process in making the assembly. The fiber glass, either in form of sheets, chopped, or mixtures thereof is placed 7 on the base 1. In a separate container, a hardener is mixed 8 with a resin. The mix is applied 10 to the fiber glass. A roller can be used to make the application uniform. Tiles 3 are placed 11 before the activated fiber glass is hardened.

FIG. 3A illustrates a pre-fabricated roof section or a panel box. The pre-fabricated roof section or other structure can be made from a base 1 cover placed on top and another cover 13, placed on the bottom. In one embodiment, base 1 and cover 13 are sheets of wood. Board 1 can be thicker than board 13. Both boards 1 and 13 can be less than about one inch in thickness. Rafters 14 attach base/sheet 1 to sheet 13. A plurality of rafters 14, preferably also made out of wood, can be placed while maintaining a gap in between them. Rafters 14 can also be made up of aluminum or FRP. A water resistant material such as plastic sheet 50, such as plastic foam (Styrofoam—closed-cell extruded polystyrene foam) (Yonolit) can be placed in between the gaps of rafters 14 to add structural flexibility and ability to withstand compression. Foamed plastic 50 is a synthetic resin converted into a sponge like mass with a closed-cell or open-cell structure. The height/thickness of the rafters 14 can be the same as that of the plastic sheet 50. Bracket 16 can be installed all along one or more sides of the base 1 for holding tiles 3 in place on case the roof has an angle. The bracket 16 can be put on the bottom of the incline and the two sides. The prefabricated roof can come with an optional layer of fiber glass 2A all around. Layer 2A can increase the tensile strength of the pre-fabricated roof or other assemblies in the same manner that a post-tension wire does. The pre-fabricated structure can have an optional fiber glass layer 2A all or partially around the structure (up to all six sides of the panel box). Just like FIG. 1, a fiber glass layer is placed on base 1, and the tiles 3 are placed on top of base 1, which is a wooden sheet. Caulking 4 can be used in between the tiles. The pre-fabricated roof is placed on a wall or column 51. The lower section of the roof that is placed inside the structure can be covered with plaster/gypsum 18. Cement 17 can be used to cover portions of the roof that are outside of the structure. Instead of cement 17 and gypsum 18, decorative panels and tiles can also be used. FIG. 3B is a blow-up of FIG. 3A.

Figure 6:
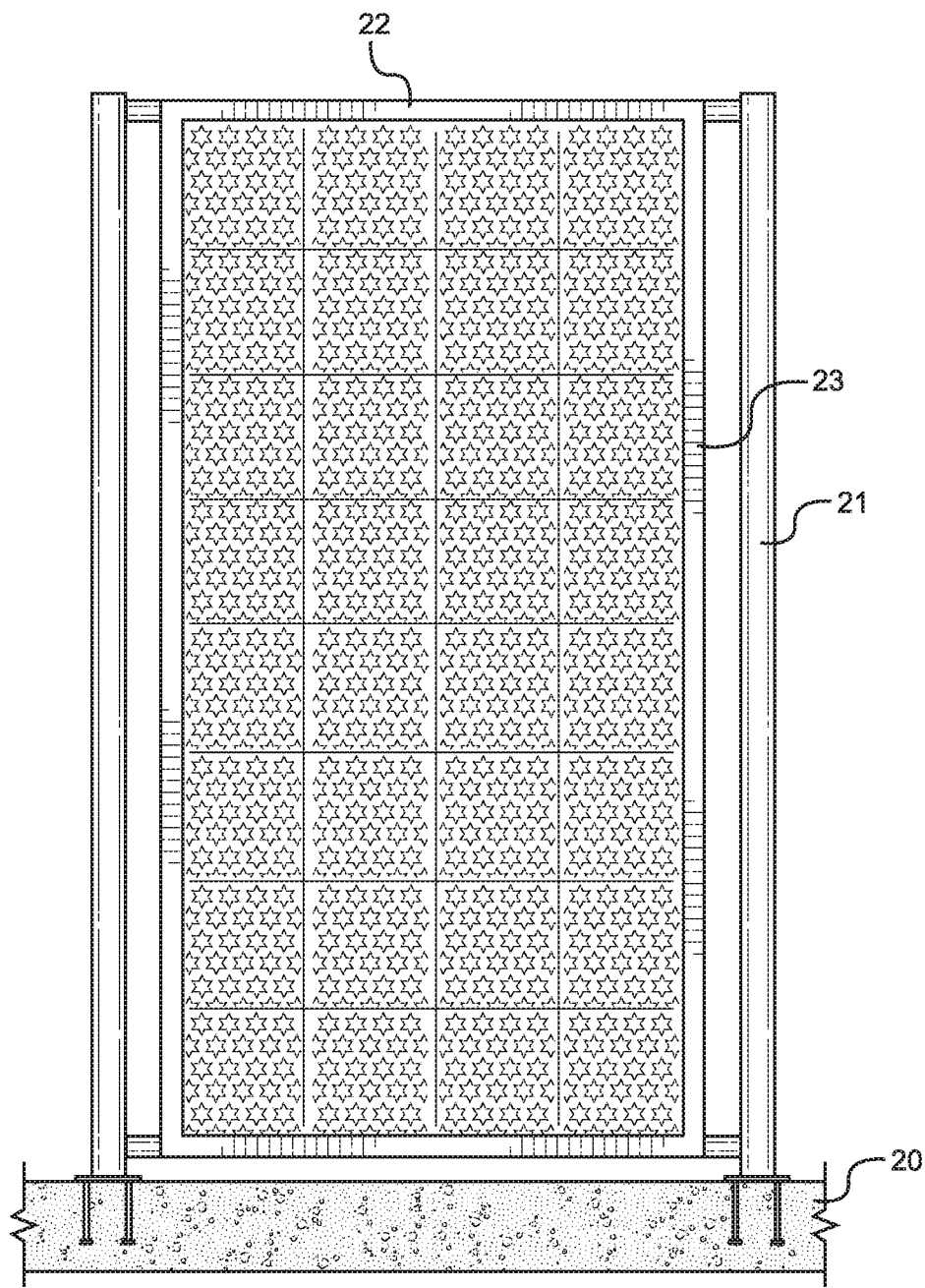
FIG. 6 illustrates a metal wall/panel before installation of tiles.
Figure 7:
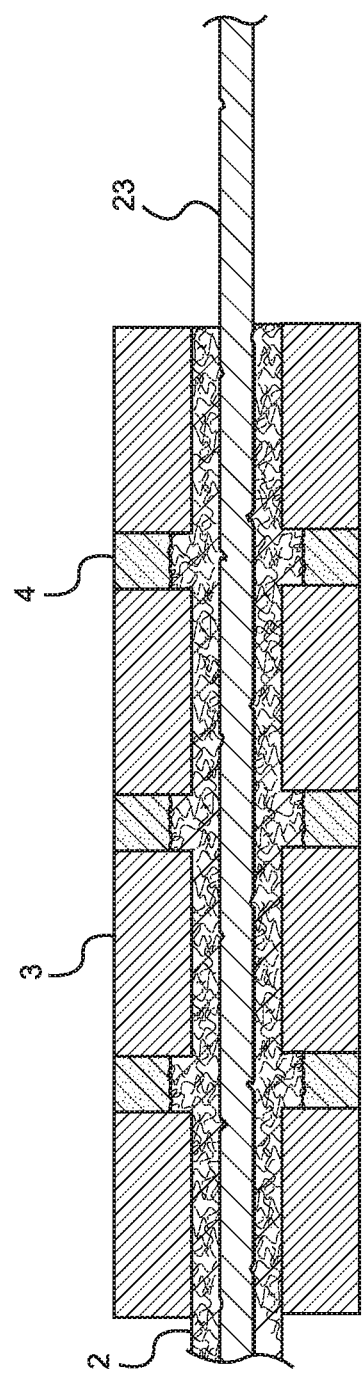
FIG. 7 illustrates the metal wall/panel of FIG. 6 after tile installation.

FIG. 6 illustrates a metal wall 23 before installation of tiles. Metal wall 23 can be held in place by posts 21 and top frame 22. Posts 21 can be held in place by attachment to concrete 20. A gap can exist below metal wall 23. FIG. 7 illustrates installation of tiles on both sides of wall 23, in the same way shown in FIG. 1.

What is claimed is:

1. A roof construction assembly comprising:
   a top and a bottom board made from wood;
   a plurality of rafters extending between and connecting the boards to form a plurality of cavities;
   a plurality of plastic foams, each of the plurality of plastic foams placed within a respective one of the plurality of cavities;
   a layer of glass fiber attached on a top surface of the top board, on a bottom surface of the bottom board and on side, outer vertical surfaces of outermost rafters of the plurality of rafters using a hardener and a resin;
   a plurality of decorative elements attached to the top board through the layer of glass fibers and the hardener and the resin on the top surface of the top board, wherein the plurality of decorative elements comprise of tiles, stones, porcelain, ceramic or façade bricks with caulking between adjacent decorative elements; and
   a bracket extending from the top surface of the top board and extending along at least one perimeter edge of the top board, wherein the bracket is configured to hold the plurality of decorative elements in place;
   wherein cement is provided to cover the layers of glass fiber provided on the side, outer vertical surfaces of the outermost rafters.

2. The roof construction assembly of claim 1, wherein the roof construction assembly is prefabricated.

3. The roof construction assembly of claim 1, wherein the plurality of plastic foams are formed as sheets.

4. The roof construction assembly of claim 1, wherein the hardener percentage compared to the resin is between 1%-2% weight/weight at STP.

5. The roof construction assembly of claim 1, wherein the layers of glass fibers are in the form of chopped fibers.

6. The roof construction assembly of claim 1, wherein an additional chemical compound acting as an adhesive is not used in between the layer of fiber glass on the top surface of the top board and the plurality of decorative elements.

7. The roof construction assembly of claim 1, wherein the resin is selected from the group consisting of one or more polyester, vinyl ester, epoxy resin, isophthalic, and mixtures thereof.

8. The roof construction assembly of claim 1, wherein the resin is a polyester resin, and the hardener is Methyl Ethyl Ketone Peroxide (MEKP).

9. The roof construction assembly of claim 8, wherein the combination of the percentage of the hardener is 1 to 1.25 relative to the polyester weight/weight at STP.

10. The roof construction assembly of claim 8, wherein the combination of the percentage of the hardener is 1 to 1.1 relative to the polyester weight/weight at STP.

11. The roof construction assembly of claim 1, wherein the top and bottom boards are made from wood with a pre-applied layer of caulking to fill any gaps in the wood of the respective boards.

12. The roof construction assembly of claim 1, wherein the hardener is an aliphatic, cycloaliphatic, or an aromatic amine and the resin is epoxy based.

13. The roof construction assembly of claim 1, wherein calcium carbonate is added to the mixture of the hardener and the resin for each layer of glass fiber.

* * * * *